United States Patent Office 2,955,523
Patented Oct. 11, 1960

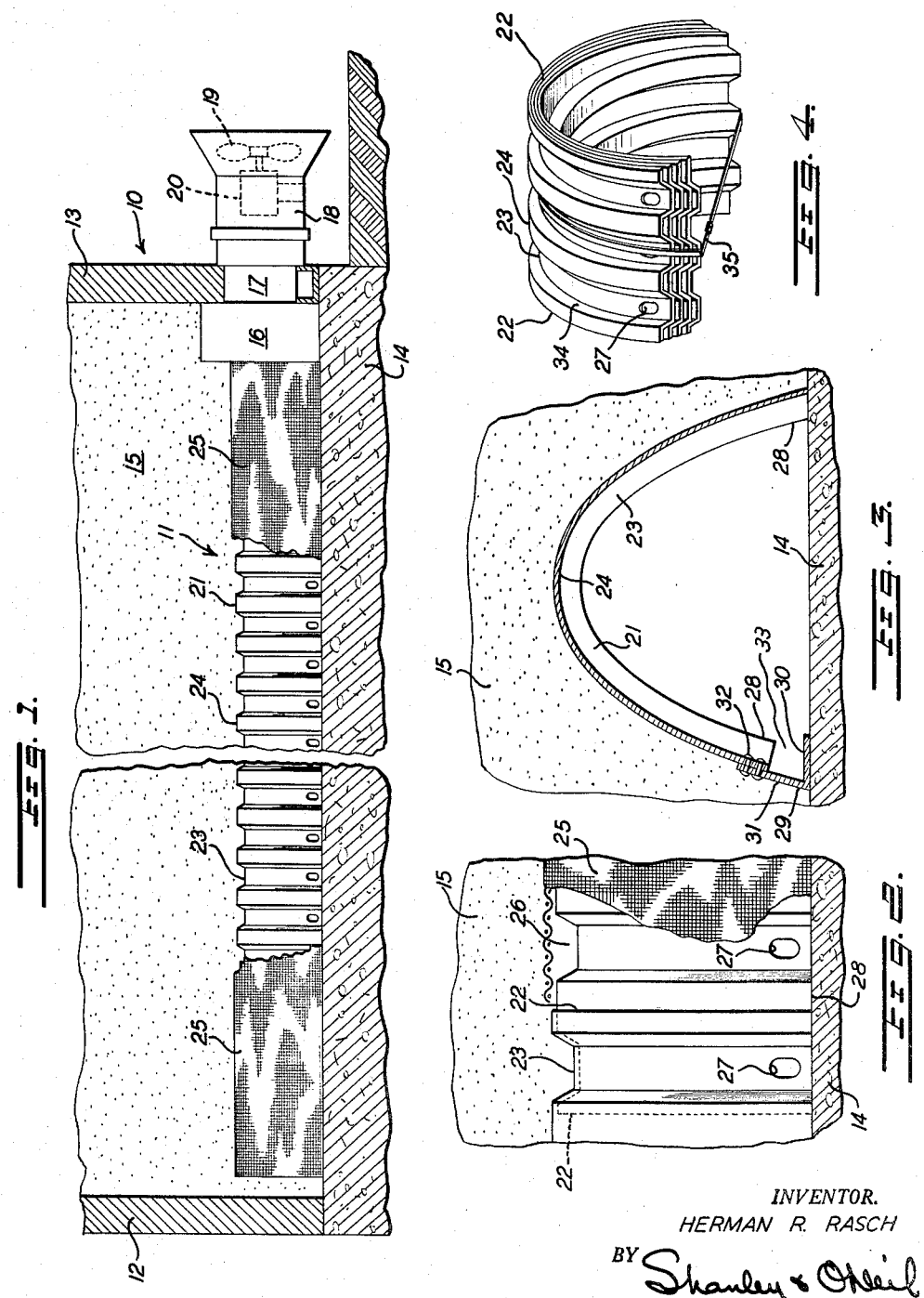

2,955,523
VENTILATING TUNNEL

Herman R. Rasch, Lincoln Park, Mich., assignor to National Steel Corporation, a corporation of Delaware Filed May 6, 1958, Ser. No. 733,384
7 Claims. (Cl. 98—56)

This invention relates to the storage of materials, and more particularly to ventilating tunnels for use in storage buildings adapted for the storage of granular materials such as grain and chemicals and the like. The invention will be described by way of example in connection with the storage of grain.

In modern practice, large quantities of grain are stored for extended periods of time in buildings especially designed for that purpose. The type of building most generally employed is the type that may be erected at relatively low cost and which usually comprises elongated concrete slab flooring upon which the grain is piled and elongated walls and an arched roof surrounding the flooring and enclosing the piled grain. In the storage of grain it is essential that air be circulated through the stored grain for adequate ventilation of the grain. In grain storing buildings of the above type presenting elongated floor areas upon which the grain is piled to relatively great depth, severe problems exist which must be overcome for adequate ventilation of the grain.

A forced air system has proven to be the most successful solution to the grain ventilating problems in grain storage buildings of the elongated type. In such a system air is required to be circulated through the stored grain for extended periods. For this purpose a ventilating tunnel is first placed on the floor and then the grain is piled on the floor so as to cover the tunnel. The tunnel is connected to a source of circulating air and is provided with passageways through its walls for air flow therethrough. The passageways in the tunnel walls are formed by openings in the tunnel walls of a size smaller than the size of the grain particles to prevent grain from entering the tunnel. The tunnel is arranged on the floor of the building with respect to the pile of grain so that all of the grain will be properly ventilated. Branch tunnels are sometimes employed leading from a centrally located main tunnel positioned longitudinally of the building and connected directly to the source of circulating air. The source of ventilating air may be supplied by a motor driven fan or blower connected by duct means to the ventilating tunnel.

Generally speaking, there are three types of grain ventilation problems. One is the removal of excessive moisture from grain. Another is the controlling of the moisture distribution through the mass of grain to prevent spoilage arising from the gradual development of concentrations of moisture in regions of the grain mass. The third is the cooling of the mass of grain to prevent spoilage and spontaneous combustion. Ventilating tunnels provided by the present invention may be employed to solve any or all of these three problems.

When it is desired to remove excessive moisture from stored grain a relatively large mass rate of flow of air must be maintained through the grain. For this reason it is necessary to provide ventilating tunnels of relatively large cross-sectional area. In cases where the grain stored includes the desired moisture content and only safe storage is to be provided, it is required that only a relatively small rate of air flow be maintained through the mass of grain, and the air circulation may be discontinuous. Consequently, ventilating tunnels of relatively smaller cross-sectional area may be employed for grain ventilation where there is no problem of moisture removal.

When grain of the desired moisture content is stored in a pile and left unventilated, the moisture in the grain will migrate to the top of the plate of grain producing undesirable regions of the grain mass having excessive concentrations of moisture. In order to overcome this moisture migration, air is circulated downwardly through the grain, that is, in a direction opposite to the direction of moisture migration. For this purpose the air may be circulated for extended periods at a relatively low rate so that the grain has a substantially constant moisture content substantially throughout its volume. Thus the ventilating tunnel is connected to a suction fan or blower and air is forced downwardly through the grain. Of course tunnels designed for moisture removal or grain drying may be employed thereafter for controlling moisture distribution by providing a reduced air flow directed downwardly through the grain. However, in view of the relative size of the two types of ventilating tunnels it would be uneconomical to employ drying tunnels for grain ventilation when moisture removal is not required.

The relatively lower mass rate of air flow suitable for controlling moisture distribution is also ordinarily suitable for cooling to prevent spoilage and spontaneous combustion. Hence, the considerations recited in connection with controlling moisture distribution by ventilation may also be considered to apply to cooling by ventilation.

However, serious difficulties arise in connection with grain ventilating tunnels as provided heretofore. Although the previous tunnels have been capable of handling an air flow theoretically sufficient to achieve any or all of the three purposes cited above, it has nevertheless been found that in practice the desired results are not achieved uniformly throughout the body of stored material by the use of grain tunnels known to the prior art. The failure of the prior art devices to provide uniform ventilation has resulted in local overheating of the grain and insufficient moisture removal or uneven moisture distribution in portions of the grain.

In an effort to overcome these disadvantages it has been proposed to increase the air flow substantially above the theoretical requirements so that all portions of the grain mass receive adequate ventilation. Although the air flow can be increased to the point that all portions of the grain mass receive adequate ventilation, the non-uniform pattern of ventilation continues at the higher levels of air flow the same as at the lower or theoretically adequate levels of air flow. The result is that certain portions of the grain mass are seriously over-ventilated with resultant excessive drying and shrinkage, to say nothing of the fact that the ventilation power consumption is excessive and the cost of storage correspondingly high. Thus, the prior art has presented no more than a choice between under-ventilating certain portions of the grain mass or over-ventilating certain other portions of the grain mass.

Accordingly, it is an object of the present invention to provide ventilating tunnel construction that overcomes the problems outlined above.

It is another object of the present invention to provide ventilating tunnel construction which achieves improved distribution of ventilating action through the stored material.

Still another object of the present invention is the provision of ventilating tunnel construction which can be installed at the storage site by relatively unskilled labor.

Yet another object of the present invention is the provision of ventilating tunnel structural units which can be assembled into tunnels of any selected length.

Finally, it is an object of the present invention to provide ventilating tunnel construction which will be relatively simple and inexpensive to manufacture, package and ship, easy to install, maintain and repair, and rugged and durable in use.

Other objects and features of the present invention will become apparent from the following detailed description considered in connection with the accompanying drawings which disclose several embodiments of the invention. It is to be expressly understood, however, that the drawings are designed for purposes of illustration only and not as a definition of the limits of the invention, reference for the latter purpose being had to the appended claims.

In the drawings, in which similar reference characters denote similar elements throughout the several views:

Figure 1 is a view partly in elevation and partly in section of a portion of a grain storage building including a ventilating tunnel constructed in accordance with the principles of the present invention;

Figure 2 is an enlarged fragmentary view of a portion of Figure 1;

Figure 3 is an enlarged cross-sectional view illustrating a modified form of the invention; and Figure 4 is a perspective view of a package of tunnel components according to the present invention.

With reference more particularly to Figure 1 of the drawings, a grain storage building 10 is shown therein provided with an elongated grain ventilating tunnel 11 constructed in accordance with the principles of the present invention. The building 10 includes end walls 12 and 13, and side walls and roof (not shown) and is provided with a concrete slab flooring 14 upon which a mass of grain 15 is supported in a pile.

The end of tunnel 11 adjacent end wall 13 is connected to adapter 16. The adapter 16 may be formed of sheet metal to provide a chamber or plenum communicating with the tunnel through a suitable opening at one of its ends, and being provided at its other end with an extension 17 passing through end wall 13 and connected to a fan housing 18. A ventilating gas pump or fan 19 driven by an electric motor 20 is positioned within fan housing 18 and in the illustrated embodiment is adapted upon operation to circulate air through the grain and into tunnel 11. It will be understood that fan 19 may if desired be so arranged as to supply air under positive pressure to tunnel 11 to move air through the grain in the opposite direction.

Tunnel 11 is in the form of an elongated arch structure formed from sheet material and including a plurality of sections 21 of sheet metal which are in substantial longitudinal alignment with each other. Sections 21 have transverse end edges 22 which overlap each other a substantial distance. Each section 21 has a plurality of transversely disposed arched indentations 23 spaced apart by transversely disposed arched webs 24 each of which is of substantial extent longitudinally of the arch structure. Thus, each section 21 comprises a sheet having an arched contour defined by an infinite number of straight parallel lines and a plurality of transversely extending arched indentations disposed on the concave side of the contour and spaced apart by strips comprising the webs 24 lying on the contour. In assembled relationship, the indentations 23 most closely adjacent end edges 22 nest within each other as seen best in Figure 2. Therefore, although the webs 24 of each section 21 are precisely aligned within manufacturing tolerances, the webs 24 of adjacent sections 21 will necessarily be slightly out of line with each other but will nevertheless be in "substantial" alignment with each other within the meaning of the specification and claims.

Superposed on the assembly of sections 21 is a flexible relatively fine wire mesh screen 25 which conforms to and rests on the contour of webs 24 and may extend somewhat beyond sections 21 on either side thereof across flooring 14. Screen 25 may be of metallic wire mesh such as copper or bronze or stainless steel or it may be of glass fiber or the like. Screen 25 is held in the described conforming relationship by the mass of grain 15 thereon and prevents the passage of grain into indentations 23. In this way, indentations 23 and screen 25 together form a plurality of transversely disposed arched ducts 26 for the flow of ventilating gas along a plurality of paths disposed transversely of the arch structure.

Ducts 26 communicate with the interior of tunnel 11 and the differences in the various embodiments of the invention comprise variations on the manner in which this communication is provided. In the embodiment of Figures 1 and 2, this communication is provided by holes 27 through the bottom walls of indentations 23 adjacent a lower edge 28 of tunnel 11. Holes 27 are of sufficiently small size to provide a substantial pressure drop in the ventilating gas passing therethrough.

In the embodiment of Figure 3, instead of by means of holes 27, communication between ducts 26 and the interior of tunnel 11 is provided by an elongated support and a gas baffle comprising an angle member 29 extending full length of tunnel 11 and having a horizontal leg 30 and an upwardly extending leg 31 disposed at about the same angle to each other as lower edges 28 of tunnel 11 are disposed relative to flooring 14. The lower edge 28 adjacent angle member 29 is supported above horizontal leg 30 by a plurality of fasteners 32 which pass through the upper end of leg 31 and through webs 24. In this way, an end of each web 24 is secured flat against leg 31 and lower edge 28 is spaced from horizontal leg 30 by a continuous, longitudinally extending gap 33. Thus, ducts 26 communicate with the interior tunnel 11 through the passageways defined by indentations 23 and the inner side of leg 29 and through gap 33, and gap 33 is of sufficiently small height to provide a substantial pressure drop in the ventilating gas passing therethrough. It will also be understood that both lower edges of tunnel 11 may be supported by angle members 29 instead of just one edge as in Figure 3, but in this latter case, in order to approximate the conditions of gas flow of the embodiment of Figure 3, only about half as many indentations 23 would be provided along the length of tunnel 11.

A very desirable feature of the present invention is the ease with which the tunnel sections 21 may be handled for storage or shipping. As shown in Figure 4, there is provided a package comprising a stack 34 of a plurality of sections 21. Means comprising a flexible metal strap 35 detachably secures the stack of sections in assembled relationship with the indentations 23 of adjacent sections 21 nested within each other so that the stack is quite compact. Any number of sections 21 may be included in the package having regard for desirable package size and weight. It is not necessary that the number of sections in a package equal the number of sections in the assembled tunnel since the packaging of the sections enables the storage of a plurality of packages adjacent the grain storage facilities so that several packages may be used to form a tunnel of any desired length.

To assemble a ventilating tunnel according to the present invention one or more packages of sections 21 is opened by removing strap 35. If the invention takes the form of the embodiment of Figures 1 and 2, the individual sections are laid out on flooring 14 starting at adapter 16 until the desired length of tunnel is reached. The sections nest at their adjacent ends as described above and no other interconnection or securement is needed since the weight of the grain will hold the tunnel in assembled relationship. Then screen 25 which is conventionally provided in the form of a roll is applied starting at adapter 16 and is unrolled full length of the assembly of sections 21 and cut off when the end of the sections is reached. If the embodiment of Figure 3 is used, lower edges 28 of sections 21 are secured to leg 31 of angle member 29 before screen 25 is applied.

There is thus provided by the present invention an elongated ventilating tunnel for use in ventilating granular material and the like, which has the structural simplicity of a simple single tunnel and at the same time has the functional advantages of a complex tunnel having a multiplicity of branches.

From a consideration of the foregoing description, it will be obvious that all of the initially recited objects of this invention have been achieved.

Although several embodiments of the invention have been disclosed and described above, it is to be expressly understood that various changes and substitutions may be made therein without departing from the spirit of the invention, as will be understood by those skilled in this art. Such changes and substitutions are considered to be within the purview and scope of the present invention. Reference therefore will be had to the appended claims for a definition of the limits of the invention.

What is claimed is:

1. An elongated ventilating tunnel for use beneath a mass of granular material and the like to ventilate the same, comprising an elongated arch structure of corrugated sheet material, the corrugations extending transversely of the tunnel to provide a plurality of outwardly opening arched troughs, gas-permeable means supported by the outer side of the arch structure and extending across the troughs and of a strength sufficient to support granular material with the gas-permeable means spaced from the bottom of the troughs thereby to form with the troughs a plurality of transversely disposed arched ducts, and means defining a plurality of openings communicating between the ducts and the interior of the arch structure, there being a said opening individual to each of a plurality of ducts.

2. A ventilating tunnel as claimed in claim 1, the gas-permeable means comprising a gas-permeable sheet extending across a plurality of the troughs.

3. A ventilating tunnel as claimed in claim 1, the troughs being spaced apart by portions of the material of the troughs disposed between the troughs and having the form of webs which are arched transversely of the tunnel and straight longitudinally of the tunnel.

4. A ventilating tunnel as claimed in claim 3, the gas-permeable means comprising a gas-permeable sheet extending across a plurality of the troughs and resting on the outer surfaces of the webs.

5. A ventilating tunnel as claimed in claim 1, the arch structure being made up of a train of similar sections of corrugated sheet material overlapped with each other at their ends, a corrugation in an end portion of each section being nested with a corrugation in the adjacent end portion of the next section.

6. A ventilating tunnel as claimed in claim 1, said openings extending through the walls of the troughs.

7. A ventilating tunnel as claimed in claim 1, and an elongated support and gas baffle extending longitudinally of and edgewise beyond and secured to the outer side of an edge of the arch structure and supporting above the bottom of the baffle the edge of the arch structure to which it is secured, said openings being comprised by the ends of the ducts adjacent the baffle.

References Cited in the file of this patent

UNITED STATES PATENTS

| | | |
|---|---|---|
| 997,383 | Foster | July 11, 1911 |
| 2,196,391 | Gronert | Apr. 9, 1940 |
| 2,524,331 | Rysdon | Oct. 3, 1950 |
| 2,572,955 | Schumacher | Oct. 30, 1951 |
| 2,705,910 | Collins | Apr. 12, 1955 |

FOREIGN PATENTS

| | | |
|---|---|---|
| 268,968 | Great Britain | Apr. 14, 1927 |

UNITED STATES PATENT OFFICE

CERTIFICATION OF CORRECTION

Patent No. 2,955,523                          October 11, 1960

Herman R. Rasch

It is hereby certified that error appears in the above numbered patent requiring correction and that the said Letters Patent should read as corrected below.

Column 2, line 8, for "plate" read -- pile --.

Signed and sealed this 25th day of April 1961.

(SEAL)
Attest:

ERNEST W. SWIDER                                   DAVID L. LADD
Attesting Officer                                       Commissioner of Patents